(12) United States Patent
Miyazaki et al.

(10) Patent No.: US 10,386,659 B2
(45) Date of Patent: Aug. 20, 2019

(54) OPTICAL MODULATOR AND OPTICAL TRANSMISSION DEVICE USING OPTICAL MODULATOR

(71) Applicant: Sumitomo Osaka Cement Co., Ltd, Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/555,605

(22) PCT Filed: Sep. 16, 2016

(86) PCT No.: PCT/JP2016/077463
§ 371 (c)(1),
(2) Date: Sep. 5, 2017

(87) PCT Pub. No.: WO2017/158886
PCT Pub. Date: Sep. 21, 2017

(65) Prior Publication Data
US 2019/0049756 A1 Feb. 14, 2019

(30) Foreign Application Priority Data

Mar. 18, 2016 (JP) .................. 2016-055655

(51) Int. Cl.
*G02F 1/01* (2006.01)
*G02F 1/225* (2006.01)
*G02F 1/21* (2006.01)

(52) U.S. Cl.
CPC ............ *G02F 1/0123* (2013.01); *G02F 1/225* (2013.01); *G02F 2001/212* (2013.01);
(Continued)

(58) Field of Classification Search
CPC .. G02F 1/0123; G02F 1/225; G02F 2001/212; G02F 2201/12; G02F 2201/58; G02F 2202/20
(Continued)

(56) References Cited

U.S. PATENT DOCUMENTS 5,689,362 A * 11/1997 Kadota .................. G02F 1/335
310/313 B
5,963,357 A * 10/1999 Kubota .................. G02F 1/225
359/239
(Continued)

FOREIGN PATENT DOCUMENTS

JP 2001215371 A 8/2001
JP 2002040382 A 2/2002
(Continued)

OTHER PUBLICATIONS

International Search Report for PCT/JP2016/077463 dated Dec. 6, 2016.

*Primary Examiner* — Jerry M Blevins
(74) *Attorney, Agent, or Firm* — Greer, Burns & Crain, Ltd.

(57) ABSTRACT

To perform a stable bias control by improving detection accuracy of intensity of an dither signal component, which is detected by a photo detector, in an optical modulator including a bias electrode to which a dither signal is applied, and a photo detector that monitors an optical signal propagating through the inside of an optical waveguide in the same substrate. The optical modulator includes: a substrate having a piezoelectric effect (102); an optical waveguide (116*a* or the like) that is formed on the substrate; a bias electrode (158*a* or the like) that controls an optical wave that propagates through the optical waveguide; and a photo detector (168*a* or the like) that is formed on the substrate, and monitors an optical signal that propagates along the
(Continued)

optical waveguide. At least one suppressing unit (190 or the like), which suppresses a surface acoustic wave that propagates from the bias electrode to the photo detector, is disposed between a region in which the bias electrode is formed and a portion in which the photo detector is disposed on the substrate.

8 Claims, 12 Drawing Sheets

(52) U.S. Cl.
CPC ...... *G02F 2201/12* (2013.01); *G02F 2201/58* (2013.01); *G02F 2202/20* (2013.01)

(58) Field of Classification Search
USPC .......................................................... 385/2
See application file for complete search history.

(56) References Cited

U.S. PATENT DOCUMENTS

| | | | |
|---|---|---|---|
| 7,239,764 | B2 | 7/2007 | Doi et al. |
| 7,315,676 | B2 * | 1/2008 | Doi .................. G02B 6/2813 385/39 |
| 2002/0041721 | A1 | 4/2002 | Nakazawa |
| 2004/0252730 | A1 * | 12/2004 | McCaughan ......... G02F 1/0305 372/6 |
| 2010/0021182 | A1 | 1/2010 | Asano et al. |
| 2013/0195394 | A1 | 8/2013 | Hosokawa et al. |
| 2015/0016771 | A1 | 1/2015 | Maruyama et al. |
| 2017/0117961 | A1 | 4/2017 | Yoneyama et al. |

FOREIGN PATENT DOCUMENTS

| | | |
|---|---|---|
| JP | 2003233042 A | 8/2003 |
| JP | 2007093806 A | 4/2007 |
| JP | 2010028741 A | 2/2010 |
| JP | 2010237497 A | 10/2010 |
| JP | 2012078407 A | 4/2012 |
| JP | 2013156473 A | 8/2013 |
| JP | 2015018193 A | 1/2015 |
| JP | 2015102789 A | 6/2015 |
| JP | 2015203737 A | 11/2015 |

* cited by examiner

OPTICAL MODULATOR AND OPTICAL TRANSMISSION DEVICE USING OPTICAL MODULATOR

TECHNICAL FIELD

Certain embodiments of the present invention relate to an optical modulator and an optical transmission device using the optical modulator, and particularly to, an optical modulator in which a bias electrode and a photo detector that monitors emitted light beams are formed on the same substrate, and an optical transmission device using the optical modulator.

BACKGROUND ART

In a high-frequency and large-capacity optical fiber communication system, optical transmission devices to which a waveguide type optical modulator is introduced have been widely used. Among these, an optical modulator, in which LiNbO3 (hereinafter, also referred to as "LN") having an electro-optic effect is used in a substrate, has been widely used in the high-frequency and large-capacity optical fiber communication system when considering that it is possible to realize optical modulation characteristics in which an optical loss is smaller and a band is wider in comparison to a modulator using a semiconductor-based material such as indium phosphide (InP), silicon (Si), and gallium arsenide (GaAs).

The optical modulator using LN is provided with a Mach-Zehnder optical waveguide, an RF electrode unit that applies a high-frequency signal to the optical waveguide as a modulation signal, and a bias electrode configured to perform various kinds of adjustment so as to maintain modulation characteristics in the optical modulator in a satisfactory manner. Examples of the bias electrode include a bias electrode that applies an electric field to the optical waveguide so as to compensate a bias point variation (so-called a temperature drift phenomenon) that is caused by a temperature variation in an environment, and a bias electrode configured to perform optical phase adjustment.

On the other hand, with regard to a modulation mode in the optical fiber communication system, multi-level modulation such as quadrature phase shift keying (QPSK) and dual polarization-quadrature phase shift keying (DP-QPSK), and a transmission format in which polarization multiplexing is introduced to the multi-level modulation become a mainstream in consideration of a recent tendency of an increase in transmission capacity.

An optical modulator (QPSK modulator) that performs QPSK modulation or an optical modulator (DP-QPSK modulator) that performs DP-QPSK modulation includes a plurality of nest-type Mach-Zehnder optical waveguides, and includes a plurality of high-frequency signal electrodes and a plurality of bias electrodes (for example, refer to PTL 1). Therefore, a device size tends to increase, and thus there is a strong demand for a reduction in size.

In the related art, as a technology for a reduction in size, there is suggested a method capable of reducing a drive voltage even in a short electrode by enhancing a mutual operation between each electrode and an optical waveguide. For example, with regard to each waveguide, there is known a configuration in which a bias electrode is constituted by a comb-like electrode (or a bamboo blind shaped electrode) including a push electrode and a pull electrode to reduce a voltage (bias voltage) to be applied to the bias electrode (for example, refer to PTL 2).

FIG. 13 is a view illustrating an example of a configuration of the DP-QPSK modulator in the related art. For example, a DP-QPSK modulator 1300 is constituted by a nest-type Mach-Zehnder optical waveguide (a bold dotted line in the drawing) and an electrode (hatched portion in the drawing) which are formed on a Z-cut LN substrate 1302. In the optical modulator, light beams from a light source (not illustrated) such as a laser diode are incident from a right direction in the drawing, and modulated light beams are emitted from a left direction in the drawing. For example, the emitted light beams are multiplexed by a space optical system and are incident to an optical fiber that is connected to an optical transmission channel.

The optical waveguide is constituted by an incident waveguide 1304 that receives incident light beams from the right direction in the drawing, an optical branching unit 1306 that branches light beams which propagate through the incident waveguide, and two Mach-Zehnder optical waveguide unit 1310a and 1310b which modulate respective light beams which are branched by the optical branching unit 1306.

The Mach-Zehnder optical waveguide unit 1310a includes an incident waveguide 1312a, an optical branching unit 1314a that branches light beams which propagate through the incident waveguide 1312a, parallel waveguides 1316a and 1318a through which light beams branched in the optical branching unit 1314a propagate, a Y-junction, Y-branch coupler 1320a that multiplexes light beams which propagate through the parallel waveguides 1316a and 1318a, and an emission waveguide 1322a that emits light beams multiplexed in the Y-junction, Y-branch coupler 1320a to the outside. In addition, the Mach-Zehnder optical waveguide unit 1310a includes a Mach-Zehnder optical waveguide 1330a (portion in a rectangle indicated by a dotted line in the drawing) and 1332a (portion in a rectangle indicated by two-dot chain line in the drawing) which are respectively formed at parts of the parallel waveguides 1316a and 1318a.

A bias electrode 1346a that is constituted by electrodes 1342a and 1344a, and a bias electrode 1352a that is constituted by electrodes 1348a and 1350a are respectively formed on a light emission side (left side in the drawing) of the parallel waveguides 1334a and 1336a of the Mach-Zehnder optical waveguide 1330a, and a light emission side (left side in the drawing) of the parallel waveguides 1338a and 1340a of the Mach-Zehnder optical waveguide 1332a. In addition, a bias electrode 1358a that is constituted by electrodes 1354a and 1356a is formed on a light emission side (left side in the drawing) of the parallel waveguides 1316a and 1318a of the Mach-Zehnder optical waveguide unit 1310a.

As illustrated in the drawing, a configuration of the Mach-Zehnder optical waveguide unit 1310b is the same as the configuration of the Mach-Zehnder optical waveguide unit 1310a. Accordingly, the optical modulator 1300 includes six bias electrodes indicated by reference numerals 1346a, 1352a, 1358a, 1346b, 1352b, and 1358b. In addition, in the optical modulator 1300, RF electrode, which are respectively constituted by electrodes 1370, 1372, 1374, 1376, 1378, 1380, 1382, 1384, and 1386, are also formed on the eight parallel waveguides 1334a, 1336a, 1338a, 1340a, 1334b, 1336b, 1338b, and 1340b of the four Mach-Zehnder optical waveguides 1330a, 1332a, 1330b, and 1332b.

Here, the bias electrodes 1346a, 1352a, 1346b, and 1352b are bias electrodes configured to adjust a bias point of an optical modulator that is constituted by the Mach-Zehnder optical waveguides 1330a, 1332a, 1330b, and 1332b, and the bias electrodes 1358*a* and 1358*b* are bias electrodes configured to adjust a phase of light beams emitted from the emission waveguides 1322*a* and 1322*b*.

In addition, in the optical modulator 1300, the bias electrodes 1346*a*, 1352*a*, 1358*a*, 1346*b*, 1352*b*, and 1358*b* are configured as a comb-like electrode as illustrated so as to reduce a voltage that is to be applied to the bias electrodes for bias point adjustment or phase adjustment.

However, when using the optical modulator by introducing the optical modulator to a device that is practically used, it is necessary to accurately control a bias voltage in order for the bias point variation not to occur so as to maintain optical transmission characteristics in a satisfactory state by compensating the temperature drift. Accordingly, a low-frequency signal (dither signal) for detection of the bias point variation and a DC voltage (DC bias voltage) for returning the bias point to a predetermined value by compensating the variation are applied to bias electrode configured to compensate a temperature drift.

That is, the variation in the bias point such as the temperature drift is compensated by monitoring an optical signal output from the optical modulator with the photo detector while applying the dither signal to the bias electrode, and by adjusting the DC bias voltage that is applied to the bias electrode so that the intensity of the dither signal included in the optical signal becomes the minimum.

For example, as illustrated in FIG. 13, the photo detector for a control of the DC bias voltage can be realized as photo detectors 1362*a* and 1362*b* which are respectively disposed at parts of branched waveguides 1360*a* and 1360*b* (that is, a part of a surface of the LN substrate 1302 in which the branched waveguides 1360*a* and 1360*b* are formed) which branch a part of emission light beams (modulated light beams) which propagate through the emission waveguides 1322*a* and 1322*b*. Outputs of the photo detectors 1362*a* and 1362*b* are output to the outside of the optical modulator 1300 through a monitor electrode 1368*a* that is constituted by electrodes 1364*a* and 1366*a* and a monitor electrode 1368*b* that is constituted by electrodes 1364*b* and 1366*b*, respectively.

FIG. 14A, FIG. 14B, and FIG. 14C are views illustrating an example of a configuration that allows a part of light beams propagating through the branched waveguide 1360*a* to be incident to the photo detector 1362*a* with a cross-section along the branched waveguide 1360*a* in a portion of the LN substrate 1302 on which the photo detector 1362*a* is mounted. In the configuration illustrated in FIG. 14A, the photo detector 1362*a* is disposed on the branched waveguide 1360*a*, and the photo detector 1362*a* is bonded to the branched waveguide 1360*a* with a transparent resin 1400. In this configuration, light beams (evanescent light beams) emitted from the branched waveguide 1360*a* are incident to an optical receiver (not illustrated), which is disposed in the vicinity of a lower edge of the photo detector 1362*a* in the drawing, for reception. In addition, in the configuration illustrated in FIG. 14B, a concavo-convex portion 1402 is provided in a surface of an LN substrate 1302' on an upper side of a branched waveguide 1360*a*' to increase surface roughness so as to scatter light beams, which propagate through the branched waveguide 1360*a*', on the surface for radiation of the light beam to the outside of the substrate. The light beams, which are radiated, are incident to the photo detector 1362*a* for reception. In addition, in the configuration illustrated in FIG. 14C, a groove 1404 is formed in a surface portion of an LN substrate 1302" in which a branched waveguide 1360*a*" is formed, light beams which propagate through the branched waveguide 1360*a*" are emitted from a wall surface of the groove, and the emitted light beams are incident to the photo detector 1362*a* for reception.

With regard to a frequency of the dither signal that is applied to the bias electrode 1358*a* and the like, particularly, as a frequency that is lower than a high-frequency signal that is applied to the RF electrode, a frequency, which is considered to have no effect on the high-frequency signal, is selected. In addition, in a case where a plurality of bias electrodes are used, a dither signal of a frequency that is different in each bias electrode is used so as to easily determine that the dither signal is applied to which bias electrode.

In this case, the dither signal that is applied to each bias electrode is selected in a range of several kHz to several hundreds of MHz in consideration of a configuration in which the dither signal does not have an effect on an RF signal frequency (typically, several tens of GHz), a configuration in which frequencies are not close to each other, a configuration in which a feedback control can be performed in a necessary speed, and the like.

Generally, in an optical modulator having the above-described configuration in the related art, the temperature drift and the like are compensated in a satisfactory manner, and thus the optical modulator can appropriately operate. However, as described above, in an optical modulator (for example, DP-QPSK modulator) that uses a plurality of bias electrodes, a new problem for a bias voltage control, which does not occur in an optical modulator including one bias electrode, may occur. This problem is specific to the optical modulator that uses the plurality of bias electrodes, and the following phenomenon is observed.

When a dither signal is applied to one bias electrode, an optical characteristic control (phase adjustment or temperature drift compensation) in one or a plurality of other bias electrodes may become unstable. In this case, the unstable phenomenon may be observed even in the one bias electrode in addition to the other bias electrodes in some cases.

The unstable phenomenon may occur not only between bias electrodes which are adjacent or close to each other but also between bias electrodes which are not adjacent to each other or between bias electrodes which are not close to each other.

The unstable phenomenon may occur or may not occur depending on an environmental temperature at the periphery of the optical modulator.

The unstable phenomenon may be solved when changing a frequency of the dither signal to another frequency.

The unstable phenomenon may not occur in a case of applying only a DC voltage to each bias electrode.

The above-described unstable phenomenon is a phenomenon that cannot be explained with "electrical interference that occurs between electrodes disposed in proximity to each other", and the cause of the unstable phenomenon has not been known.

The inventors of the invention have made a thorough investigation on the unstable phenomenon in a bias control operation in an optical modulator including a plurality of bias electrodes. As a result, they obtained a finding that the cause of the unstable phenomenon is a surface acoustic wave (SAW) that occurs when a dither signal is applied to the bias electrodes on an LN substrate. That is, when the dither signal is applied to one of the bias electrodes which are formed on the LN substrate, the surface acoustic wave (SAW) occurs on a substrate surface due to a piezoelectric effect of LN that is a substrate raw material, and the surface acoustic wave propagates along the substrate surface and reaches another bias electrode. According to this, the other bias electrode receives the dither signal that is applied to the one bias electrode, and the dither signal that is received give interference to a bias control operation in the other bias electrode and has an adverse effect on the bias control operation.

The surface acoustic wave is an acoustic wave that propagates along the substrate surface, and is reflected and scattered from the substrate surface. The surface acoustic wave also operates on a distant bias electrode that is not close, and intensity or a frequency of the surface acoustic wave varies in accordance with a variation in substrate physical properties (particularly, a propagation velocity of the acoustic wave on the substrate surface, linear expansion of the substrate) due to a temperature variation, and the like. Therefore, the unstable phenomenon occurs between bias electrodes which are not adjacent or close to each other, and the unstable phenomenon occurs depending on the environmental temperature.

In addition, since the comb-like electrode is used as the bias electrode, when the bias electrode is applied with a dither signal of the same frequency as a characteristic frequency at which electro-acoustic conversion efficiency (for example, a ratio of the power of the surface acoustic wave that occurs to the power of the electrical signal that is applied), which represents efficiency at the time of converting the electrical signal applied to the comb-like electrode into the surface acoustic wave, becomes the maximum, the above-described unstable phenomenon becomes significant. In addition, the characteristic frequency is determined by an electrode interval of the comb-like electrode that is the bias electrode.

FIG. 15 is a view illustrating an example of a configuration of the comb-like electrode that can be used in the bias electrode of the optical modulator. A comb-like electrode 1500 illustrated in the drawing is constituted by two electrodes 1502 and 1504. The electrode 1502 includes three electrodes 1510, 1512, and 1514 which extend in parallel to each other in a horizontal direction, and the electrode 1504 includes three electrodes 1520, 1522, and 1524 which extend in parallel to each other in the horizontal direction (hereinafter, electrode portions such as the electrodes 1510, 1512, 1514, 1520, 1522, and 1524 parallel to each other in the comb-like electrode are referred to as "electrodes which constitute the comb-like electrode"). A total of six electrodes 1520, 1510, 1522, 1512, 1524, and 1514 have the same electrode width h and are spaced away from each other by a gap (electrode gap) a. Accordingly, an electrode interval (pitch) p is given by the following Expression (1).

[Expression 1]

$$p = a + h \quad (1)$$

At this time, a characteristic frequency $f_0$ (that is, a frequency at which the electro-acoustic conversion efficiency becomes the maximum) of the comb-like electrode 1500 is given by the following Expression (2).

[Expression 2]

$$f_0 = v/\lambda = v/2p = v/2(a+h) \quad (2)$$

Here, v is a propagation velocity of the surface acoustic wave on the substrate surface, and λ is a wavelength of the surface acoustic wave. In other words, a comb-like electrode having the electrode interval p has the characteristic frequency $f_0$ expressed by Expression (2). When a voltage signal having the same frequency as the characteristic frequency $f_0$ is applied to the comb-like electrode, the comb-like electrode strongly excites the surface acoustic wave of the same frequency as the characteristic frequency $f_0$. In contrast, when the surface acoustic wave of the same frequency as characteristic frequency $f_0$ is incident to the comb-like electrode having the characteristic frequency $f_0$, an electrical signal having the same frequency as the characteristic frequency $f_0$ is strongly induced to the comb-like electrode. In bias electrodes having the comb-like electrode structure, the induced electrical signal becomes a strong noise signal, and has an adverse effect on a bias control operation.

As is clear from Expression (2), the characteristic frequency $f_0$ can be allowed to vary by changing the electrode width h and/or the electrode gap a to change the electrode interval p.

The propagation velocity v of the surface acoustic wave has a different value depending on a kind of a material that is used in the substrate, a direction of the substrate surface with respect to a molecular arrangement (for example, a crystal orientation) of the material, a propagation direction of the surface acoustic wave, and the like. For example, in a case of using a Y-cut LN substrate as a substrate, in a surface acoustic wave that propagates in a Z direction, the propagation velocity becomes approximately 3500 m/s. In a case of using a 128° Y-cut LN substrate as a substrate, in a surface acoustic wave that propagates in an X direction, the propagation velocity becomes approximately 4000 m/s.

The electrode width h and the electrode gap a are determined in consideration of a transverse field pattern or a filed diameter (typically, approximately 10 μm) of an optical wave that propagates through the optical waveguide.

For example, in a case where the electrode interval is 15 μm, the electrode width is 20 and the velocity of the surface acoustic wave is 3500 m/s, the characteristic frequency $f_0$ becomes approximately 50 MHz. In this case, when a dither signal having a frequency component close to 50 MHz is applied to the bias electrode that is constituted by the comb-like electrode 1500 illustrated in the drawing, a strong surface acoustic wave excites. The surface acoustic wave propagates along the substrate surface toward a direction (an upper and lower direction in the drawing) that is perpendicular to a longitudinal direction of the electrode (for example, the electrode 1520) that constitutes the comb-like electrode 1500, and reaches another bias electrode (comb-like electrode). In the other bias electrode, the surface acoustic wave is converted into an electrical signal due to a piezoelectric effect, and a noise signal of the frequency occurs. The bias control operation is affected by the noise signal.

The degree of the effect on the other bias electrode becomes the strongest in a case where the other bias electrode is disposed at a position to which the surface acoustic wave reaches from the direction perpendicular to the longitudinal direction of an electrode that constitutes the other bias electrode, and the other bias electrode has the same characteristic frequency as a frequency of the surface acoustic wave. In addition, the degree of the effect also depends on a value of electro-acoustic conversion efficiency in the characteristic frequency of the other device, and the greater the efficiency is, the greater the degree is.

The inventors of the invention have devised a new configuration for suppressing or reducing interference between bias electrodes through the surface acoustic wave on the basis of the finding, and have verified that the configuration is effective to suppress the interference (a specific configuration is described in Japanese Patent Application No. 2016-036962).

However, as is the case with the optical modulator 1300 illustrated in FIG. 13, in a case where the photo detectors 1362a and 1362b, which detect the magnitude (detect a bias point) of the dither signal component included in an optical signal (more specifically, emission light propagating through the emission waveguide 1322a) that is modulated by the dither signal applied to the bias electrode 1358a and the like, are provided on the substrate 1302, as a new problem, the surface acoustic wave, which occurs in the bias electrode 1358a, and the like, propagates along the substrate surface of the LN substrate 1302 and reaches a mounting region of the photo detectors 1362a and 1362b. As a result, a variation in power of received light beams may be caused to occur in the photo detectors 1362a and 1362b.

That is, as illustrated in FIG. 14A, FIG. 14B, and FIG. 14C, the photo detectors 1362a and 1362b are disposed in proximity to an upper portion of the branched waveguides 1360a and 1360b. Therefore, when the surface acoustic wave propagating along the surface of the LN substrate 1302 arrives, a geometric distance between the photo detectors 1362a and 1362b, and the branched waveguides 1360a and 1360b slightly varies. According to this, the quantity of light beams (the quantity of received light beams), which are emitted from the branched waveguides 1360a and 1360b and are received by the photo detectors 1362a and 1362b, may vary due to the slight variation in the geometric distance.

In addition, when the surface acoustic wave acts on the optical waveguide, a state of propagating light beams varies by a photo elasticity effect (a phenomenon in which a refractive index varies when a pressure is applied) and the like, and the amount of light beams received by the photo detectors 1362a and 1362b may vary.

The variation in the quantity of received light beams includes a frequency component (that is, a frequency component of a dither signal that is applied to the bias electrode 1358a and the like) of various propagating surface acoustic waves. Accordingly, a detection error for the intensity of the dither signal component, which is included in emission light beams (modulated light beams) which propagate through the emission waveguide 1322a, is caused to occur in the photo detectors 1362a and 1362b. As a result, the unstable phenomenon occurs in the bias voltage control operation (also referred to as "bias control operation") that is performed by using the photo detectors 1362a and 1362b, and a transmission quality of the light beams, which are modulated by the optical modulator 1300, deteriorates.

In addition, in a photo detector that is formed on the same substrate as a bias electrode, the detection error for the dither signal component, which is caused by the surface acoustic wave, may occur in an optical modulator that includes a plurality of bias electrodes and can generate a lot of surface acoustic waves as illustrated in FIG. 13, or may occur in an optical modulator including a single bias electrode. Accordingly, it is necessary to find a solution for reducing the detection error.

CITATION LIST

Patent Literature

[Patent Literature No. 1] Japanese Laid-open Patent Publication No. 2010-237497

[Patent Literature No. 2] Japanese Laid-open Patent Publication No. 2003-233042

SUMMARY OF INVENTION

Technical Problem

From the above-described background, in an optical modulator including, on the same substrate, a bias electrode to which a bias voltage and a dither signal are applied, and a photo detector that monitors intensity of a dither signal component including in emission light beams, it is demanded to solve an unstable phenomenon of a bias control operation by reducing a detection error in the dither signal component intensity that is detected by the photo detector.

Solution to Problem

According to an aspect of the invention, there is provided an optical modulator. The optical modulator includes: a substrate having a piezoelectric effect; an optical waveguide that is formed on the substrate; a bias electrode that controls an optical wave that propagates through the optical waveguide; and a photo detector that is formed on the substrate, and monitors an optical signal that propagates along the optical waveguide. At least one suppressing unit, which suppresses a surface acoustic wave that propagates from the bias electrode to the photo detector, is disposed between a region in which the bias electrode is formed and a portion in which the photo detector is disposed on the substrate.

According to another aspect of the invention, the suppressing unit may be constituted by a metallic film that is provided between the region in which the bias electrode is formed and the portion in which the photo detector is disposed on the substrate.

According to still another aspect of the invention, the metallic film may be an electrode to which the photo detector is connected.

According to still another aspect of the invention, the suppressing unit may be constituted by a resin that is applied between the region in which the bias electrode is formed and the portion in which the photo detector is disposed on the substrate.

According to still another aspect of the invention, the suppressing unit may be constituted by a metallic film that is formed on the substrate to surround the periphery of the photo detector.

According to still another aspect of the invention, the suppressing unit may be constituted by a resin that is applied onto the substrate at the periphery of an edge of the photo detector.

According to still another aspect of the invention, the suppressing unit may be constituted by a resin that is applied onto the substrate to surround the periphery of the photo detector.

According to still another aspect of the invention, there is provided an optical transmission device including the optical modulator according to the above-described aspects.

DESCRIPTION OF EMBODIMENTS

Hereinafter, embodiments of the invention will be described with reference to the accompanying drawings. Furthermore, an optical modulator illustrated in the embodiments is, for example, a DP-QPSK modulator. However, the invention is not limited thereto, and can be executed by various types of optical modulators including a bias electrode and a photo detector that monitors emission light beams (modulated light beams) on the same substrate.

First Embodiment

Figure 1:
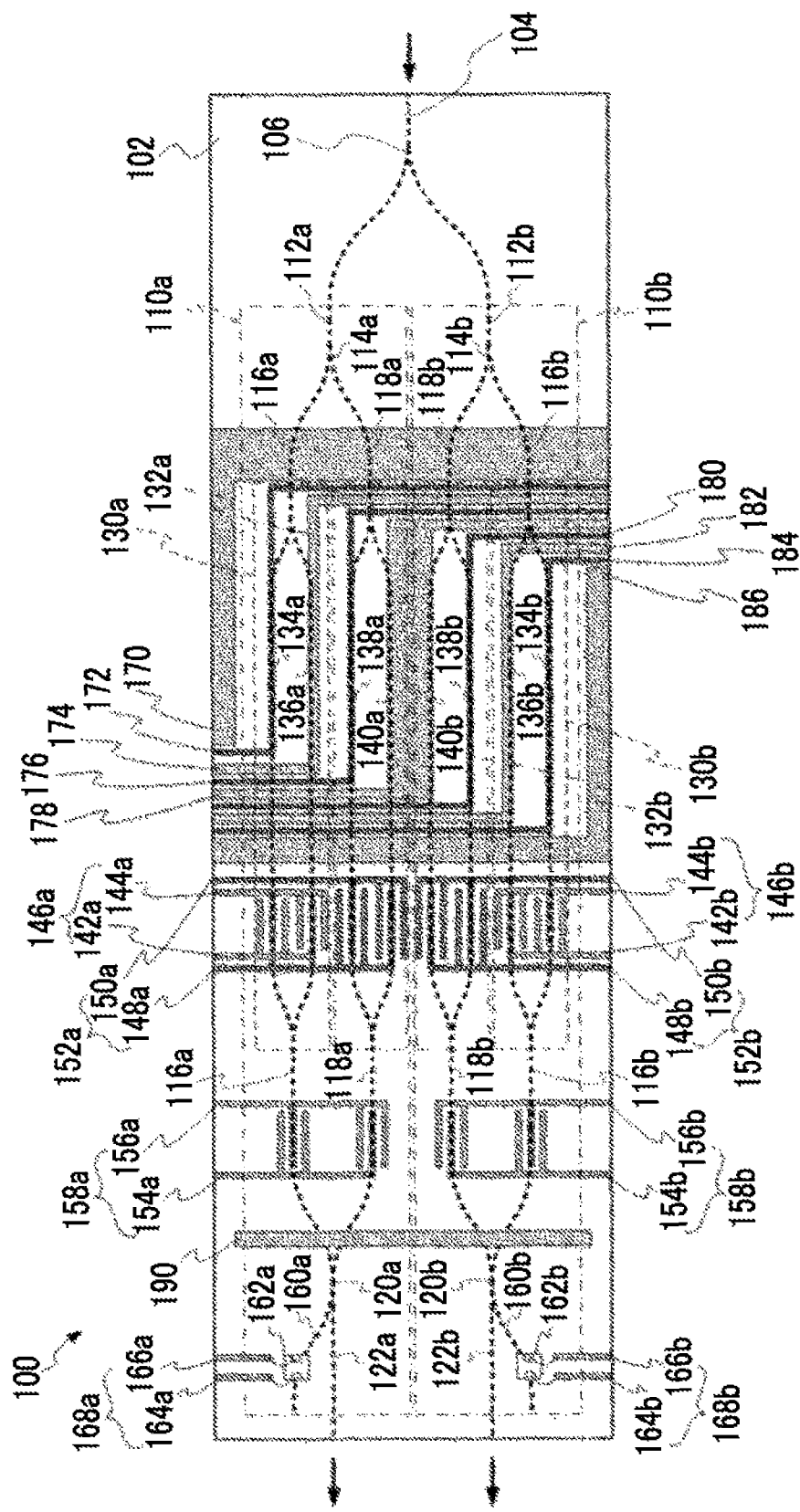
FIG. 1 is a view illustrating a configuration of an optical modulator according to a first embodiment of the invention.
Figure 13:
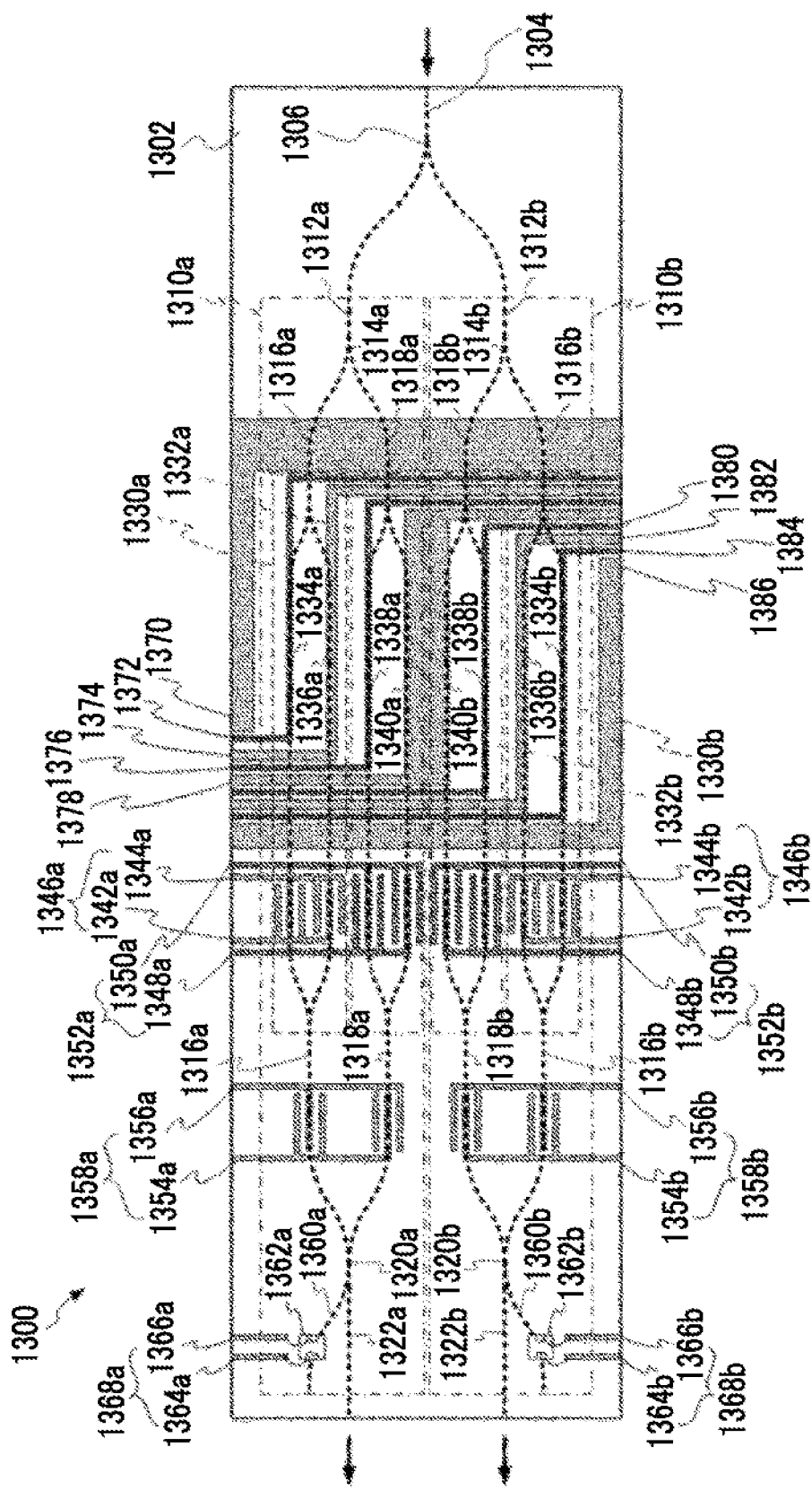
FIG. 13 is a view illustrating a configuration of an optical modulator in the related art.

First, description will be given of a first embodiment of the invention. FIG. 1 is a view illustrating a configuration of an optical modulator according to the first embodiment of the invention. As described above, an optical modulator 100 according to this embodiment is, for example, the DP-QPSK modulator, and a basic configuration is the same as in the DP-QPSK modulator 1300 of the related art as illustrated in FIG. 13. That is, for example, the optical modulator 100 is constituted by a nest-type Mach-Zehnder optical waveguide (a bold dotted line in the drawing) that is formed on the LN substrate 102, and an electrode (a hatched portion in the drawing). In the optical modulator, light beams from light source (not illustrated) such as a laser diode are incident from a right direction in the drawing, and modulated light beams are emitted from a left direction in the drawing. For example, the emitted light beams are multiplexed by a space optical system, and are incident to an optical fiber that is connected to an optical transmission channel.

The optical waveguide is constituted by an incident waveguide 104 that receives incident light beams from a right direction in the drawing, an optical branching unit 106 that branches light beams which propagate through the incident waveguide 104, and two Mach-Zehnder optical waveguides 110a and 110b which respectively modulate light beams branched in the optical branching unit 106.

The Mach-Zehnder optical waveguide 110a includes an incident waveguide 112a, an optical branching unit 114a that branches light beams which propagate through the incident waveguide 112a, parallel waveguides 116a and 118a through which the light beams branched in the optical branching unit 114a propagate, a Y-junction, Y-branch coupler 120a that multiplexes the light beams which propagate through the parallel waveguides 116a and 118a, and an emission waveguide 122a that emits the resultant light beam that is multiplexed in the Y-junction, Y-branch coupler 120a to the outside. In addition, the Mach-Zehnder optical waveguide 110a includes a Mach-Zehnder optical waveguide 130a (portion in a rectangle indicated by a dotted line in the drawing) and 132a (portion in a rectangle indicated by two-dot chain line in the drawing) which are respectively formed at parts of the parallel waveguides 116a and 118a.

A bias electrode 146a that is constituted by electrodes 142a and 144a, and a bias electrode 152a that is constituted by electrodes 148a and 150a are respectively formed on a light emission side (left side in the drawing) of the parallel waveguides 134a and 136a of the Mach-Zehnder optical waveguide 130a, and a light emission side (left side in the drawing) of the parallel waveguides 138a and 140a of the Mach-Zehnder optical waveguide 132a. In addition, a bias electrode 158a that is constituted by electrodes 154a and 156a is formed on a light emission side (left side in the drawing) of the parallel waveguides 116a and 118a of the Mach-Zehnder optical waveguide 110a. In addition, the bias electrodes 146a, 152a, 158a, 146b, 152b, and 158b respectively constitute a comb-like electrode as illustrated in the drawing.

As illustrated in the drawing, a configuration of the Mach-Zehnder optical waveguide 110b is the same as the configuration of the Mach-Zehnder optical waveguide 110a. In addition, in the optical modulator 100, RF electrodes, which are respectively constituted by electrodes 170, 172, 174, 176, 178, 180, 182, 184, and 186, are also formed on the eight parallel waveguides 134a, 136a, 138a, 140a, 134b, 136b, 138b, and 140b of the four Mach-Zehnder optical waveguides 130a, 132a, 130b, and 132b.

Here, the bias electrodes 146a, 152a, 146b, and 152b are bias electrodes configured to adjust a bias point of an optical modulator that is constituted by the Mach-Zehnder optical waveguides 130a, 132a, 130b, and 132b, and the bias electrodes 158a and 158b are bias electrodes configured to adjust a phase of light beams emitted from the emission waveguides 122a and 122b.

In addition, the optical modulator 100 includes branched waveguides 160a and 160b which respectively extend from the Y-junction, Y-branch couplers 120a and 120b and branch parts of emission light beams which propagate through the emission waveguides 122a and 122b, and photo detectors 162a and 162b which are disposed on a substrate surface of the LN substrate 102 in which the branched waveguides 160a and 160b are formed. Here, each of the photo detector 162a and 162b is constituted by using, for example, a photo diode (PD) as an optical detection element (not illustrated), and is disposed at a position at which the optical detection element faces each of the branched waveguides 160a and 160b so as to detect light beams from each of the branched waveguides 160a and 160b by using the optical detection element.

Figure 14A:
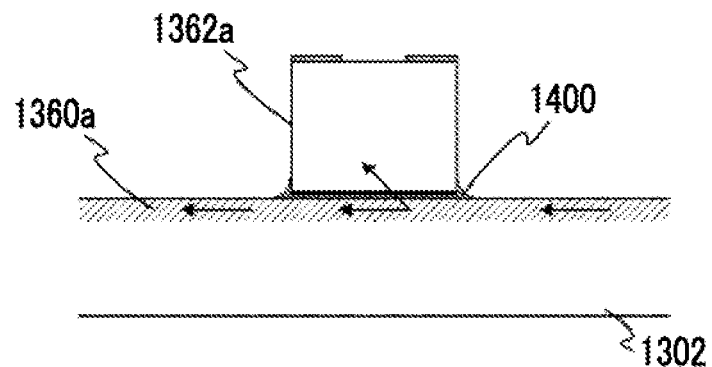
FIG. 14A is a view illustrating an example of a configuration of allowing a part of light beams propagating through a branched waveguide to be incident to a photo detector in the optical modulator.
Figure 14B:
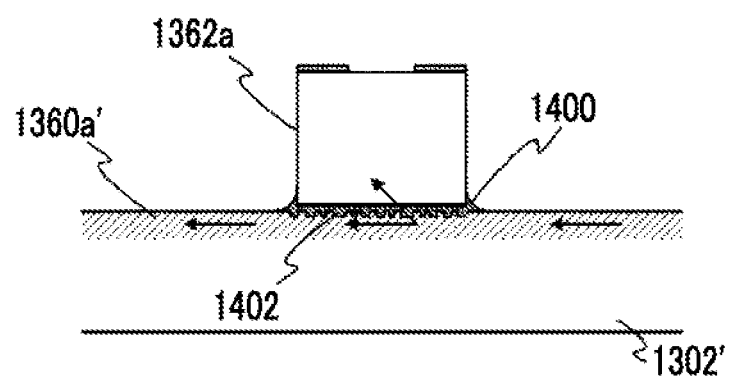
FIG. 14B is a view illustrating another example of a configuration of allowing a part of light beams propagating through the branched waveguide to be incident to the photo detector in the optical modulator.
Figure 14C:
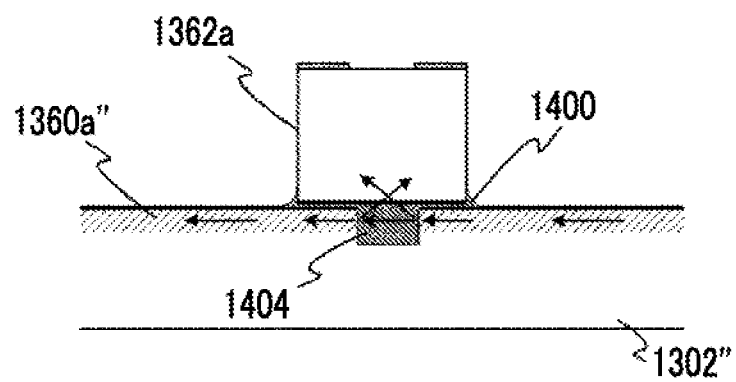
FIG. 14C is a view illustrating still another example of a configuration of allowing a part of light beams propagating through the branched waveguide to be incident to the photo detector in the optical modulator.
Figure 15:
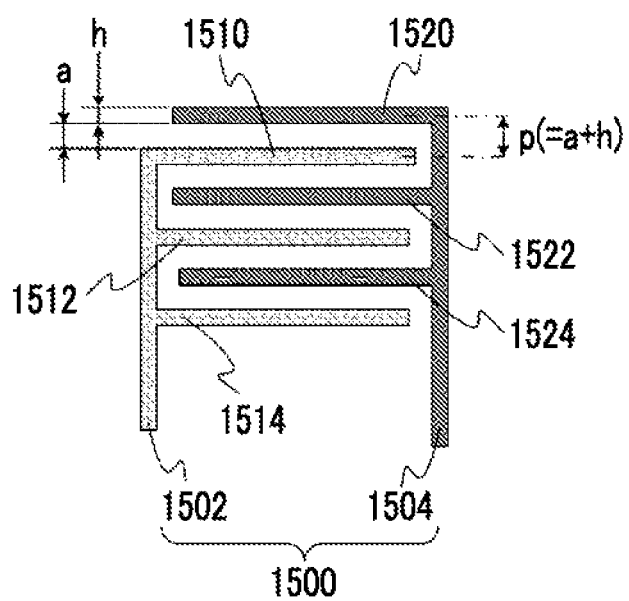
FIG. 15 is a view illustrating an example of a configuration of a comb-like electrode.

In addition, for example, the photo detectors 162a and 162b are fixed to portions on the substrate surface of the LN substrate 102, at which the branched waveguides 160a and 160b are formed, by an adhesive using a transparent resin, and receive light beams (evanescent light beams) emitted from the branched waveguides 160a and 160b, for example, as is the case with the configuration illustrated in FIG. 14A.

Outputs of the photo detectors 162a and 162b are output to the outside of the optical modulator 100 through a monitor electrode 168a constituted by electrodes 164a and 166a and a monitor electrode 168b constituted by electrodes 164b and 166b, respectively.

Particularly, in the optical modulator 100 of this embodiment, a guard pattern 190, which is constituted by a metallic film, is formed on the LN substrate 102 between a region in which the bias electrodes 146a, 152a, 146b, 152b, 158a, and 158b, from which a surface acoustic wave occurs and which have a comb-like electrode structure, are formed, and a portion (or a region) in which the photo detectors 162a and 162b are disposed on the LN substrate 102. The guard pattern 190 operates as an absorber for a surface acoustic wave that propagates along the surface of the LN substrate 102, and constitutes a suppressing unit (hereinafter, also referred to as a surface acoustic wave suppressing unit) that suppresses (or blocks) the surface acoustic wave that occurs from the bias electrodes 146a, 152a, 146b, 152b, 158a, and 158b and reaches mounting portions of the photo detectors 162a and 162b.

Figure 2:
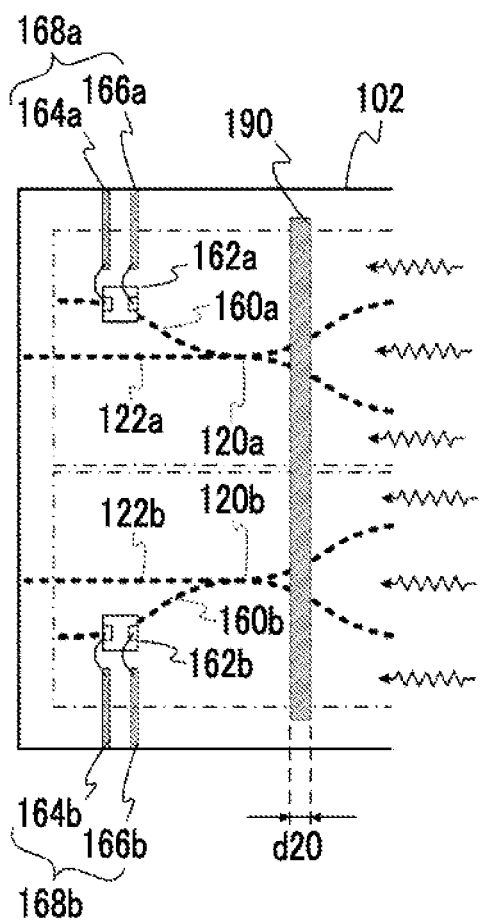
FIG. 2 is a partial detailed view of the periphery of a guard pattern, which is a surface acoustic wave suppressing unit, of the optical modulator illustrated in FIG. 1.

FIG. 2 is a partial detailed view of the periphery of the guard pattern 190 of the optical modulator 100 illustrated in FIG. 1. Surface acoustic waves (schematically illustrated by a broken-line arrow in the drawing), which arrive from regions in which the bias electrodes 146a, 152a, 146b, 152b, 158a, and 158b are formed on a right side in comparison to the guard pattern 190, are absorbed by the guard pattern 190, and arrival to the mounting portions of the photo detectors 162a and 162b is blocked or suppressed. Furthermore, the guard pattern 190 may be provided at an arbitrary position as long as the guard pattern 190 is disposed between the region in which the bias electrodes 146a, 152a, 146b, 152b, 158a, and 158b, from which a surface acoustic wave occurs and which have a comb-like electrode structure, are formed, and a portion (or a region) in which the photo detectors 162a and 162b are disposed.

For example, the guard pattern 190 may be constituted by using gold (Au), and a surface acoustic wave absorbing effect due to the guard pattern 190 becomes higher as a width d20 of the guard pattern 190, which is measured along a direction facing the region in which the photo detectors 162a and 162b are disposed from the region in which the bias electrodes 146a, 152a, 146b, 152b, 158a, and 158b are formed, is wider, and as the film thickness of the guard pattern 190 is greater. Accordingly, it is preferable that the size (including the thickness) of the guard pattern 190 is determined in correspondence with the intensity of a surface acoustic wave that may occur from the bias electrodes 146a, 152a, 146b, 152b, 158a, and 158b. Particularly, it is preferable that the width d20 of the guard pattern 190 is longer than at least a wavelength of the surface acoustic wave from the viewpoint of effectively absorbing the surface acoustic wave. As a result, it is more preferable that the width d20 is wider than the longest wavelength $\lambda$max of a surface acoustic wave that may occur from the bias electrodes 146a, 152a, 146b, 152b, 158a, and 158b (that is, d20≥$\lambda$max).

In addition, generally, in a case where the metallic film is formed on an optical waveguide, it is known that light beams which propagate through the optical waveguide are absorbed by the metallic film and are attenuated. Accordingly, for example, a buffer layer may be formed between the guard pattern 190 and the surface of the LN substrate 102 by using a material (for example, $SiO_2$) having a refractive index lower than that of an optical waveguide (for example, 116a, 116b, or the like) formed on the LN substrate 102 so as to prevent the light beams from being attenuated. In addition, as another configuration for preventing the light beams from being attenuated, in the guard pattern 190 illustrated in FIG. 1 and FIG. 2, a portion, which is formed on an optical waveguide (for example, 116a, 116b, or the like), may be removed, and the guard pattern 190 may be constituted by a plurality of metallic film portions.

In the above-described embodiment, the guard pattern 190, which is constituted by a metallic film that absorbs a surface acoustic wave, is provided as a surface acoustic wave suppressing unit between the region in which the bias electrodes 146a, 152a, 146b, 152b, 158a, and 158b from which a surface acoustic wave occurs are formed, and the portion (region) in which the photo detectors 162a and 162b are disposed. However, in another embodiment, various surface acoustic wave suppressing units may be used as long as a surface acoustic wave, which occurs from the bias electrodes 146a, 152a, 146b, 152b, 158a, and 158b and reaches the photo detectors 162a and 162b, is capable of being suppressed or blocked without limitation to the above-described configuration.

Hereinafter, modification examples of the surface acoustic wave suppressing unit in this embodiment will be described with reference to FIG. 3 to FIG. 9. FIG. 3 to FIG. 9 illustrate various surface acoustic wave suppressing units which can be used instead of the guard pattern 190. Furthermore, in FIG. 3 to FIG. 9, for example, a peripheral portion of the photo detector 162a represents the surface acoustic wave suppressing unit that can be used instead of the guard pattern 190. This configuration illustrated in FIG. 3 to FIG. 9 may be applied to a peripheral portion of the photo detector 162b in the same manner to suppress or block the surface acoustic wave that reaches the photo detector 162b.

First Modification Example

First, description will be given of a first modification example of the surface acoustic wave suppressing unit that is used in the optical modulator 100 illustrated in FIG. 1. In this modification example, as the surface acoustic wave suppressing unit, a resin, which absorbs the surface acoustic wave, is used instead of the guard pattern 190.

Figure 3:
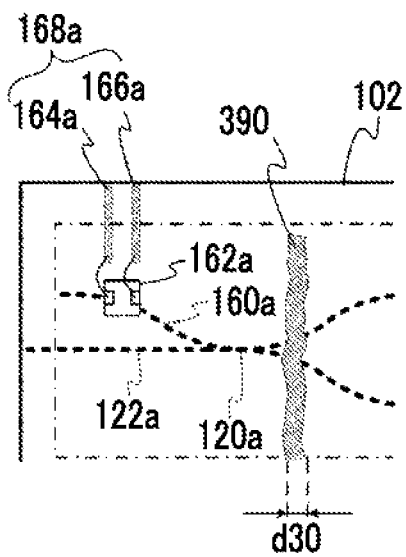
FIG. 3 is a view illustrating a first modification example of the surface acoustic wave suppressing unit that can be used in the optical modulator illustrated in FIG. 1.

FIG. 3 is a view illustrating a surface acoustic wave suppressing unit, which can be used instead of the guard pattern 190, according to this modification example. Furthermore, in FIG. 3, the same constituent element as the constituent element illustrated in FIG. 1 and FIG. 2 will be indicated by the same reference numeral as in FIG. 1 and FIG. 2, and description in FIG. 1 and FIG. 2 will be cited.

In the modification example illustrated in FIG. 3, as the surface acoustic wave suppressing unit, a resin 390 is applied on the LN substrate 102 between a region in which the bias electrodes 146a, 152a, 146b, 152b, 158a, and 158b, from which a surface acoustic wave occurs and which have a comb-like electrode structure, are formed, and a portion (region) in which the photo detector 162a is disposed on the LN substrate 102. The resin 390 operates as an absorber for a surface acoustic wave that propagates along the surface of the LN substrate 102, and constitutes the surface acoustic wave suppressing unit that suppresses or blocks the surface acoustic wave that occurs from the bias electrodes 146a, 152a, 146b, 152b, 158a, and 158b, and reaches the mounting portion of the photo detector 162a. For example, the resin 390 may be set as an ultraviolet-curable adhesive or an epoxy-based adhesive.

Furthermore, a surface acoustic wave absorbing effect due to the resin 390 becomes higher as a width d30 of the resin 390, which is measured along a direction facing the region in which the photo detectors 162a and 162b are disposed from the region in which the bias electrodes 146a, 152a, 146b, 152b, 158a, and 158b are formed, is wider, and as the thickness of the resin 390 is greater. Accordingly, it is preferable that the size (including the thickness) of the resin 390 is determined in correspondence with the intensity of a surface acoustic wave that may occur from the bias electrodes 146a, 152a, 146b, 152b, 158a, and 158b. Particularly, it is preferable that the width d30 of the resin 390 is longer than at least a wavelength of the surface acoustic wave from the viewpoint of effectively absorbing the surface acoustic wave. As a result, it is more preferable that the width d30 is wider than the longest wavelength λmax of a surface acoustic wave that may occur from the bias electrodes 146a, 152a, 146b, 152b, 158a, and 158b (that is, d30≥λmax).

Second Modification Example

Next, description will be given of a second modification example of the surface acoustic wave suppressing unit that is used in the optical modulator 100 illustrated in FIG. 1.

Figure 4:
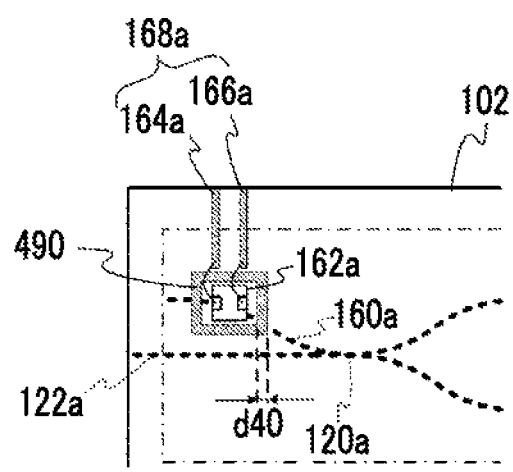
FIG. 4 is a view illustrating a second modification example of the surface acoustic wave suppressing unit that can be used in the optical modulator illustrated in FIG. 1.

FIG. 4 is a view illustrating a surface acoustic wave suppressing unit, which can be used instead of the guard pattern 190, according to this modification example. Furthermore, in FIG. 4, the same constituent element as the constituent element illustrated in FIG. 1 and FIG. 2 will be indicated by the same reference numeral as in FIG. 1 and FIG. 2, and description in FIG. 1 and FIG. 2 will be cited.

In this modification example, as illustrated in FIG. 4, as the surface acoustic wave suppressing unit, a rectangular guard pattern 490, which is formed from a metal (for example, gold (Au)) that absorbs the surface acoustic wave, is formed on the LN substrate 102 to surround the mounting portion (or mounting region) of the photo detector 162a against the region in which the bias electrode 146a and the like from which a surface acoustic wave occurs are formed. Surface acoustic waves, which reach the photo detector 162a from all directions toward the photo detector 162a, are effectively suppressed or blocked due to the guard pattern 490.

The surface acoustic wave suppressing (blocking) effect due to the guard pattern 490 depends on a width d40 and the thickness of a strip-shaped metallic pattern that constitutes the guard pattern 490. The electrodes 164a, 166a, and the like, which are connected to the photo detector 162a, are disposed in proximity to each other at the periphery of the photo detector 162a as illustrated in FIG. 4. Therefore, in a case where it is difficult to secure a sufficiently great width d40, it is necessary to increase the thickness of the strip-shaped metallic pattern. However, it is preferable that the width d40 of the strip-shaped metallic pattern, which constitutes the guard pattern 490, is longer than at least the arriving surface acoustic wave so as to effectively suppress the surface acoustic wave. As a result, it is more preferable that the width d40 is wider than the longest wavelength λmax of a surface acoustic wave that may occur from the bias electrodes 146a, 152a, 146b, 152b, 158a, and 158b (that is, d40≥λmax).

Third Modification Example

Next, description will be given of a third modification example of the surface acoustic wave suppressing unit that is used in the optical modulator 100 illustrated in FIG. 1.

Figure 5:
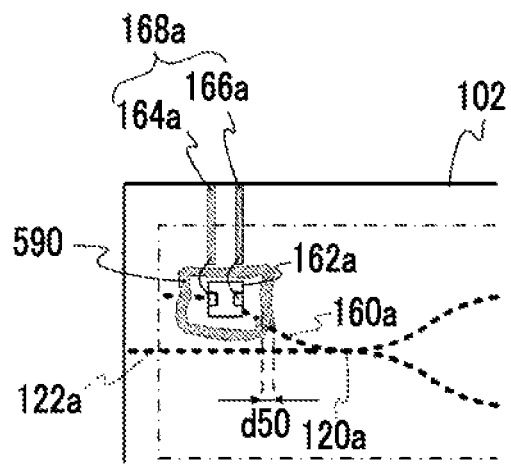
FIG. 5 is a view illustrating a third modification example of the surface acoustic wave suppressing unit that can be used in the optical modulator illustrated in FIG. 1.

FIG. 5 is a view illustrating a surface acoustic wave suppressing unit that can be used instead of the guard pattern 190 according to this modification example. Furthermore, in FIG. 5, the same constituent element as the constituent element illustrated in FIG. 1 and FIG. 2 will be indicated by the same reference numeral as in FIG. 1 and FIG. 2, and description in FIG. 1 and FIG. 2 will be cited.

In this modification example, as illustrated in FIG. 5, as the surface acoustic wave suppressing unit, a resin 590, which absorbs the surface acoustic wave, is applied onto the LN substrate 102 to surround the mounting portion (or mounting region) of the photo detector 162a against the region in which the bias electrode 146a and the like from which a surface acoustic wave occurs are formed. Surface acoustic waves, which reach the photo detector 162a from all directions toward the photo detector 162a, are effectively suppressed or blocked due to the resin 590. Preferable conditions for the width and the thickness of the resin 590 are the same as in the resin 390 that is the first modification as illustrated in FIG. 3. Particularly, it is preferable that d50 satisfies a relationship of d50λmax (λmax is the longest wavelength λmax of a surface acoustic wave that may occur).

Fourth Modification Example

Next, description will be given of a fourth modification example of the surface acoustic wave suppressing unit that is used in the optical modulator 100 illustrated in FIG. 1.

Figure 6:
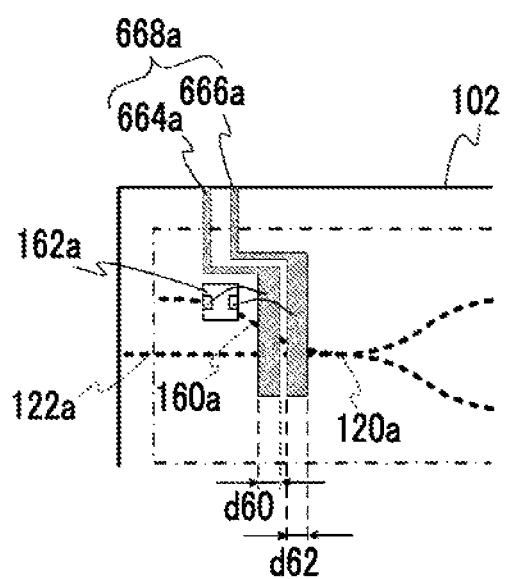
FIG. 6 is a view illustrating a fourth modification example of the surface acoustic wave suppressing unit that can be used in the optical modulator illustrated in FIG. 1.

FIG. 6 is a view illustrating a surface acoustic wave suppressing unit, which can be used instead of the guard pattern 190, according to this modification example. Furthermore, in FIG. 6, the same constituent element as the constituent element illustrated in FIG. 1 and FIG. 2 will be indicated by the same reference numeral as in FIG. 1 and FIG. 2, and description in FIG. 1 and FIG. 2 will be cited.

In this modification example, as illustrated in FIG. 6, electrodes 366a and 366b, which constitutes a monitor electrode 368a that is connected to the photo detector 162a, are formed to extend to a portion between the region in which the bias electrode 146a and the like from which a surface acoustic wave occurs are formed, and the region in which the photo detector 162a is disposed, and the electrodes 366a and 366b function as the surface acoustic wave suppressing unit. Here, particularly, it is preferable that at least one of widths d60 and d62 of the electrodes 366a and 366b is wider than the longest wavelength λmax of a surface acoustic wave that may occur from the bias electrodes 146a, 152a, 146b, 152b, 158a, and 158b from the viewpoint of effectively suppressing the surface acoustic wave.

Fifth Modification Example

Next, description will be given of a fifth modification example of the surface acoustic wave suppressing unit that is used in the optical modulator 100 illustrated in FIG. 1.

Figure 7A:
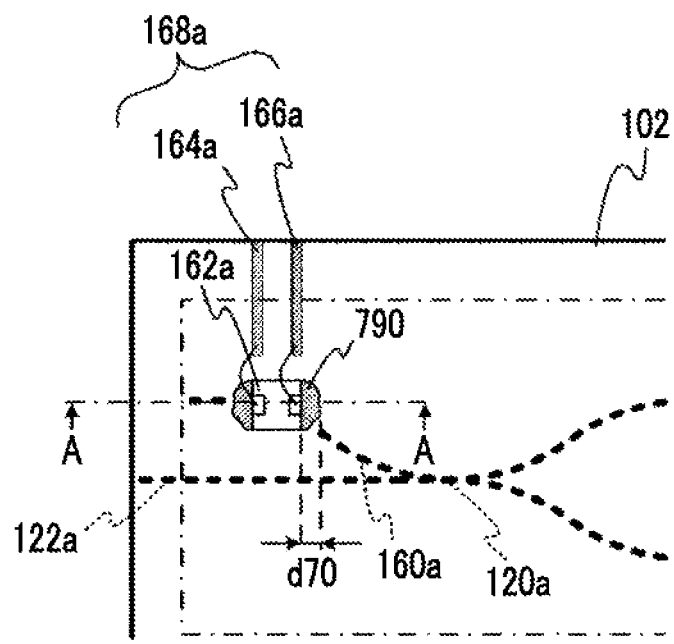
FIG. 7A is a view illustrating a fifth modification example of the surface acoustic wave suppressing unit that can be used in the optical modulator illustrated in FIG. 1.
Figure 7B:
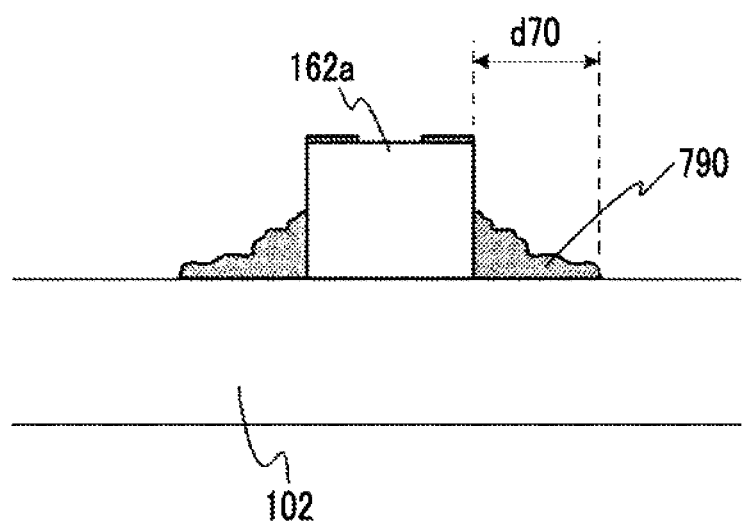
FIG. 7B is a cross-sectional view taken along arrow A-A in the surface acoustic wave suppressing unit illustrated in FIG. 7A.

FIG. 7A and FIG. 7B are views illustrating a surface acoustic wave suppressing unit that can be used instead of the guard pattern 190 according to this modification example. Furthermore, in FIG. 7A and FIG. 7B, the same constituent element as the constituent element illustrated in FIG. 1 and FIG. 2 will be indicated by the same reference numeral as in FIG. 1 and FIG. 2, and description in FIG. 1 and FIG. 2 will be cited.

FIG. 7A is a partial detailed view of the periphery of the photo detector 162a, and FIG. 7B is a cross-sectional view taken along arrow A-A in a portion of the photo detector 162a. Furthermore, in FIG. 7B, description of the branched waveguide 160a is omitted.

In this modification example, as illustrated in FIG. 7A and FIG. 7B, a resin 790 is applied to a portion of an edge (hereinafter, also referred to as "edge in a surface acoustic wave arriving direction") of the photo detector 162a on a side (that is, a right side in the drawing) that is in contact with a region, in which the bias electrode 146a and the like from which a surface acoustic wave occurs are formed, over a length d70 from the edge. The resin 790 functions as the surface acoustic wave suppressing unit, and suppresses a surface acoustic wave that arrives at the photo detector 162a from the region in which the bias electrode 146a and the like are formed.

An application length d70 of the resin 790 is a length measured from the edge in the surface acoustic wave arriving direction in the photo detector 162a to an end of the resin 790. It is preferable that the length d70 is equal to or greater than the longest wavelength λmax (that is, d70≥λmax) in arriving surface acoustic waves from the viewpoint of effectively suppressing the surface acoustic wave. Furthermore, as is the case with the resin 390 according to the first modification example as illustrated in FIG. 3, the resin 790 may be formed from, for example, an ultraviolet-curable adhesive or an epoxy-based adhesive.

In addition, as the adhesive, the same material as that of an adhesive, which fixes the photo detector 162a onto the substrate, can be used. In this case, the adhesive is applied in an amount greater than a typical amount of the adhesive that fixes the photo detector 162a onto the substrate so that the adhesive is leaked to the periphery of an edge of the photo detector during fixing. In this case, it is possible to realize a configuration that suppresses an effect of the surface acoustic wave without increasing the number of assembling processes, and thus this case is preferable.

Furthermore, in the configuration illustrated in FIG. 7A and FIG. 7B, the same amount of resin as the resin 790, which is applied to an edge portion in the surface acoustic wave arriving direction, is also applied to an edge portion of the photo detector 162a which is opposite to the edge in the surface acoustic wave arriving direction. The reason for this is as follows. For example, when the same amount of resin as the resin 790, which is an adhesive, is applied to edge portions facing each other, the resin portions applied to the edge portions facing each other are allowed to thermally expanded and contracted to the same extent as each other during an environmental temperature variation, thereby suppressing a variation caused by the environmental temperature variation in optical coupling efficiency between the branched waveguide 160a and the photo detector 162a.

In addition, in this modification example illustrated in FIG. 7A and FIG. 7B, the resin is applied to the edge in the surface acoustic wave arriving direction and the edge facing the edge in the surface acoustic wave arriving direction in the photo detector 162a. However, the resin may be applied to the entirety of peripheral edges of the photo detector 162a without limitation to the configuration. In this case, as is the case with the length d70, it is preferable that a distance of a resin applied portion, which broadens toward to an outer side from the edges of the photo detector 162a, is equal to or greater than the longest wavelength λmax in arriving surface acoustic waves. According to this, it is possible to effectively suppress surface acoustic waves which arrive from all directions toward the photo detector 162a.

Sixth Modification Example

Next, description will be given of a sixth modification example of the surface acoustic wave suppressing unit that is used in the optical modulator 100 illustrated in FIG. 1.

Figure 8:
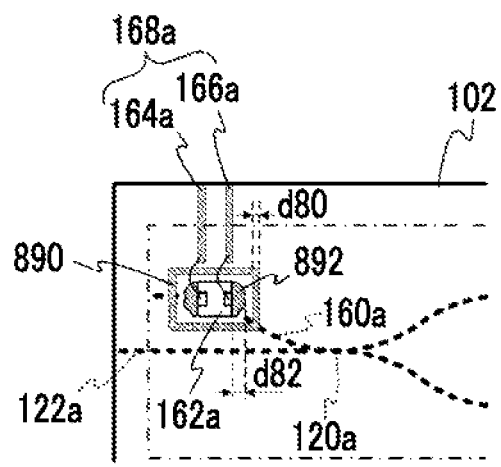
FIG. 8 is a view illustrating a sixth modification example of the surface acoustic wave suppressing unit that can be used in the optical modulator illustrated in FIG. 1.

FIG. 8 is a view illustrating a surface acoustic wave suppressing unit that can be used instead of the guard pattern 190 according to this modification example. Furthermore, in FIG. 8, the same constituent element as the constituent element illustrated in FIG. 1 and FIG. 2 will be indicated by the same reference numeral as in FIG. 1 and FIG. 2, and description in FIG. 1 and FIG. 2 will be cited.

This modification example has a configuration in combination of the guard pattern 490 according to the second modification example illustrated in FIG. 4 and the resin 790 according to the fifth modification example illustrated in FIG. 7A and FIG. 7B. That is, in this modification example, as illustrated in FIG. 8, a rectangular guard pattern 890, which is constituted by a strip-shaped metallic film (for example, gold (Au)) having a width d80 is formed to surround the mounting portion of the photo detector 162a, and a resin 892 is applied to an edge portion of the photo detector 162a in a direction toward the region, in which the bias electrode 146a and the like from which a surface acoustic wave occurs are formed, over a distance d82 from the edge. That is, in this modification example, the guard pattern 890 and the resin 892 function as the surface acoustic wave suppressing unit, and it is possible to more effectively block an arriving surface acoustic wave. Furthermore, it is preferable that at least one of the width d80 and the distance d82 is equal to or greater than the longest wavelength λmax in arriving surface acoustic waves from the viewpoint of effectively blocking the surface acoustic waves.

Seventh Modification Example

Next, description will be given of a seventh modification example of the surface acoustic wave suppressing unit that is used in the optical modulator 100 illustrated in FIG. 1.

Figure 9:
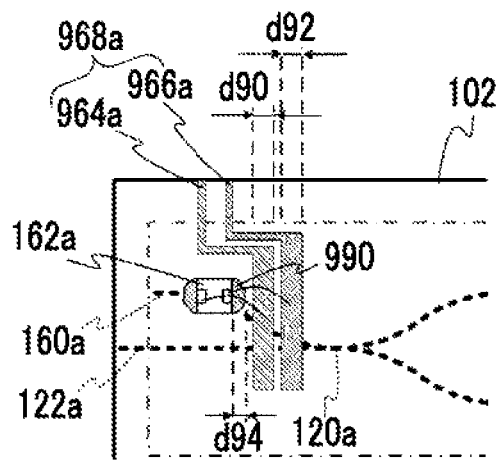
FIG. 9 is a view illustrating a seventh modification example of the surface acoustic wave suppressing unit that can be used in the optical modulator illustrated in FIG. 1.

FIG. 9 is a view illustrating a surface acoustic wave suppressing unit that can be used instead of the guard pattern 190 according to this modification example. Furthermore, in FIG. 9, the same constituent element as the constituent element illustrated in FIG. 1 and FIG. 2 will be indicated by the same reference numeral as in FIG. 1 and FIG. 2, and description in FIG. 1 and FIG. 2 will be cited.

This modification example has a configuration in combination of the monitor electrode 668a according to the fourth modification example illustrated in FIG. 6 and the resin 790 according to the fifth modification example illustrated in FIG. 7A and FIG. 7B. That is, in this modification example, as illustrated in FIG. 9, electrodes 964a and 966a, which constitute a monitor electrode 968a that is connected to the photo detector 162a, have widths d90 and d92, respectively, and are formed to extend to a portion between the region in which the bias electrode 146a and the like, from which a surface acoustic wave occurs, are formed and the portion (region) in which the photo detector 162a is disposed. In addition, a resin 990 is applied to an edge portion (that is, an edge portion in the surface acoustic wave arriving direction) of the photo detector 162a on a side (that is, a right side in the drawing) that is in contact with the region, in which the bias electrode 146a and the like from which a surface acoustic wave occurs are formed, over a length d94 from the edge. That is, in this modification example, the electrodes 964a and 966a, and the resin 990 function as the surface acoustic wave suppressing unit, and more effectively suppress arriving surface acoustic waves.

Furthermore, it is preferable that at least one of d90, d92, and d94 is equal to or greater than the longest wavelength λmax in arriving surface acoustic waves from the viewpoint of effectively blocking the surface acoustic waves.

In the above-described modification example, as illustrated in FIG. 9, the resin 990 is applied to the edge portion of the photo detector 162a in the surface acoustic wave arriving direction. However, in another embodiment, for example, in a case where it is possible to sufficiently block the surface acoustic wave that arrives at the edge portion by the electrodes 964a and 966a, the resin 990 may be applied to an edge portion of the photo detector 162a on a lower side in the drawing so as to further block a surface acoustic wave that goes around from ends (ends on a lower side in the drawing) of the electrodes 964a and 966a and arrives at the photo detector 162a without limitation to the above-described configuration.

Second Embodiment

Figure 10:
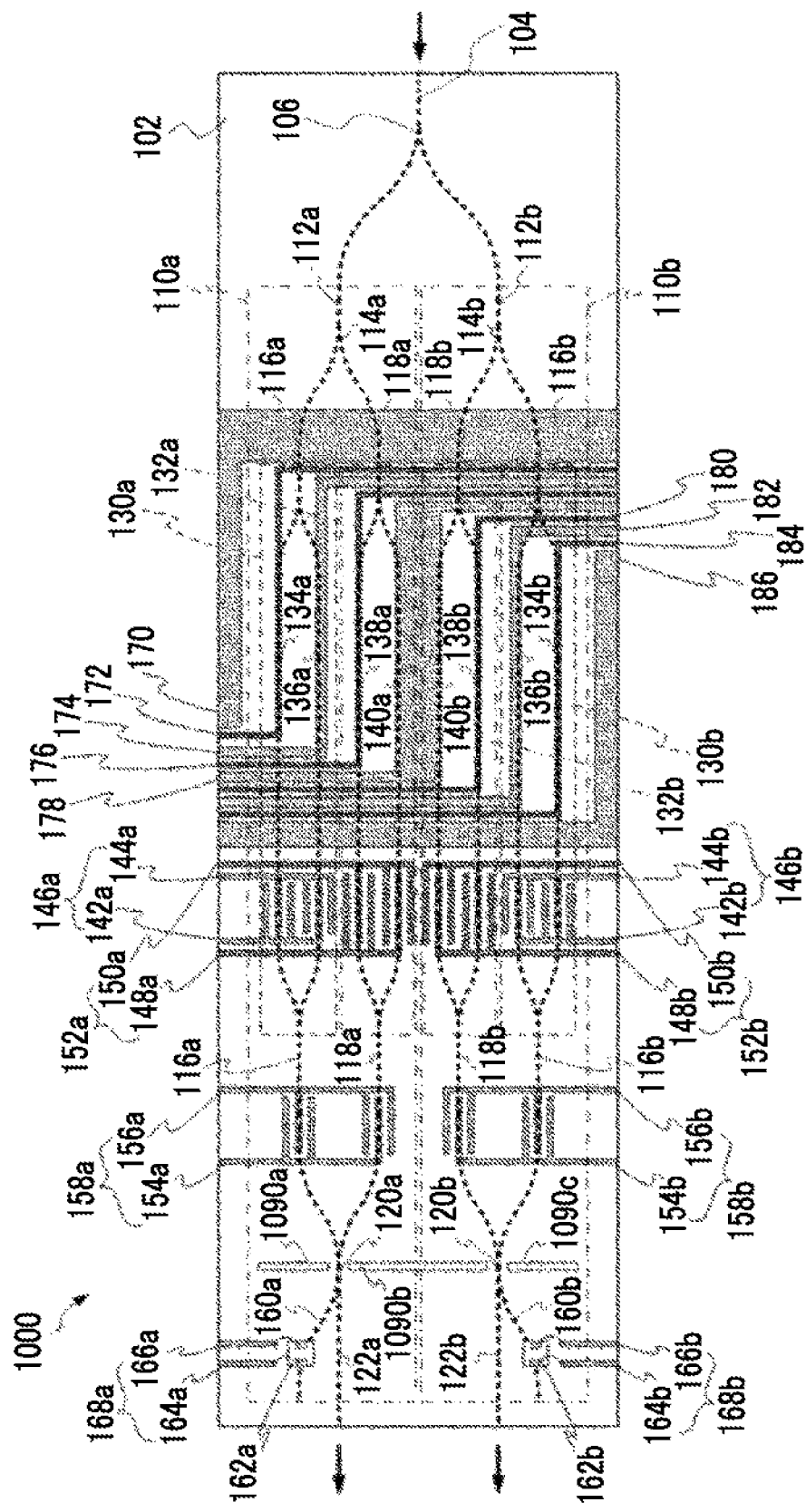
FIG. 10 is a view illustrating a configuration of an optical modulator according to a second embodiment of the invention.

Next, description will be given of a second embodiment of the invention. FIG. 10 is a view illustrating a configuration of an optical modulator according to the second embodiment of the invention. In FIG. 10, the same reference numeral as in FIG. 1 will be given to the same constituent element as in the optical modulator 100 according to the first embodiment illustrated in FIG. 1, and description in the first embodiment will be cited.

An optical modulator 1000 according to this embodiment illustrated in FIG. 10 has the same configuration as the optical modulator 100 according to the first embodiment. However, the optical modulator 1000 includes an LN substrate 1002 instead of the LN substrate 102, and the LN substrate 1002 includes grooves 1090a, 1090b, and 1090c (may be collectively referred to as "groove 1090") in the vicinity of the Y-junction, Y-branch couplers 120a and 120b instead of the guard pattern 190.

As is the case with the guard pattern 190 of the optical modulator 100, the groove 1090 is disposed between the region, in which the bias electrodes 146a, 152a, 146b, 158a, and 158b from which a surface acoustic wave occurs and which have a comb-like electrode structure, are formed, and the region in which the photo detectors 162a and 162b are disposed, and constitutes a surface acoustic wave suppressing unit in the optical modulator 1000.

Figure 11:
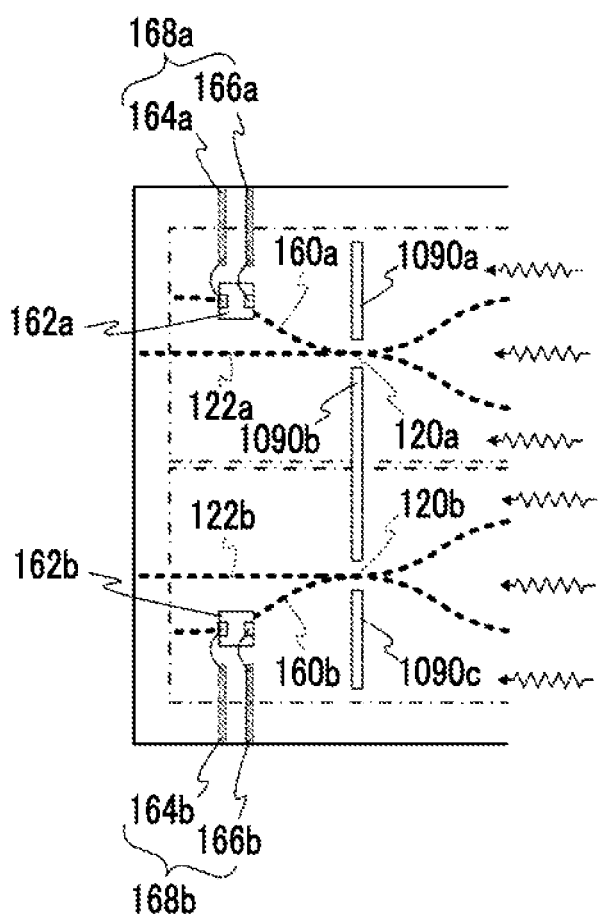
FIG. 11 is a partial detailed view of the periphery of a groove, which is a surface acoustic wave suppressing unit, of the optical modulator illustrated in FIG. 10.

FIG. 11 is a partial detailed view of the periphery of a groove 1090, which is a surface acoustic wave suppressing unit, of the optical modulator 1000 illustrated in FIG. 10. Propagation of a surface acoustic wave (schematically indicated by a broken-line arrow in the drawing), which arrives from the region in which the bias electrodes 146a, 152a, 146b, 152b, 158a, and 158b are formed, on a right side in the drawing in comparison to the groove 1090 (that is, grooves 1090a, 1090b, and 1090c) is blocked due to the groove 1090, and arrival to the mounting portion of the photo detectors 162a and 162b is suppressed.

Furthermore, the groove 1090 is formed in a region except for an optical waveguide formed portion on the LN substrate 1002. However, the width of the optical waveguides is as very narrow as approximately 10 μm. Accordingly, the intensity of a surface acoustic wave, which is leaked from a portion in which the groove 1090 is not formed (that is, between the grooves 1090a and 1090b and between the grooves 1090b and 1090c) except for the optical waveguide formed portion and arrives at the photo detectors 162a and 162b may be negligible.

Furthermore, the groove 1090 may be disposed at an arbitrary position as long as the position is located between the region in which the bias electrodes 146a, 152a, 146b, 152b, 158a, and 158b, from which a surface acoustic wave occurs and which have a comb-like electrode structure, are formed, and the region in which the photo detectors 162a and 162b are disposed. However, as described above, it is necessary to form the groove 1090 at a portion except for the optical waveguide formed portion, and thus it is preferable that the groove 1090 is disposed so that a site that is divided by the optical waveguide formed portion become small. For example, in an example illustrated in FIG. 10, the groove 1090 is disposed at a position except for only the Y-junction, Y-branch couplers 120a and 120b (that is, at positions which deviate from each other in a horizontal direction in the drawing, division occurs at portions (that is, four sites) in which four optical waveguides (116a, 118a, 116b, and 118b or four optical waveguides (160a, 122a, 122b, and 160b) are formed, but division occurs at two sites at a position of the groove 1090 illustrated in FIG. 10).

Third Embodiment

Next, description will be given of a third embodiment of the invention. This embodiment relates to an optical transmission device on which any one of the optical modulator 100 (including arbitrary modification examples illustrated in FIG. 3 to FIG. 9) and 1000 illustrated in the first and second embodiments is mounted.

Figure 12:
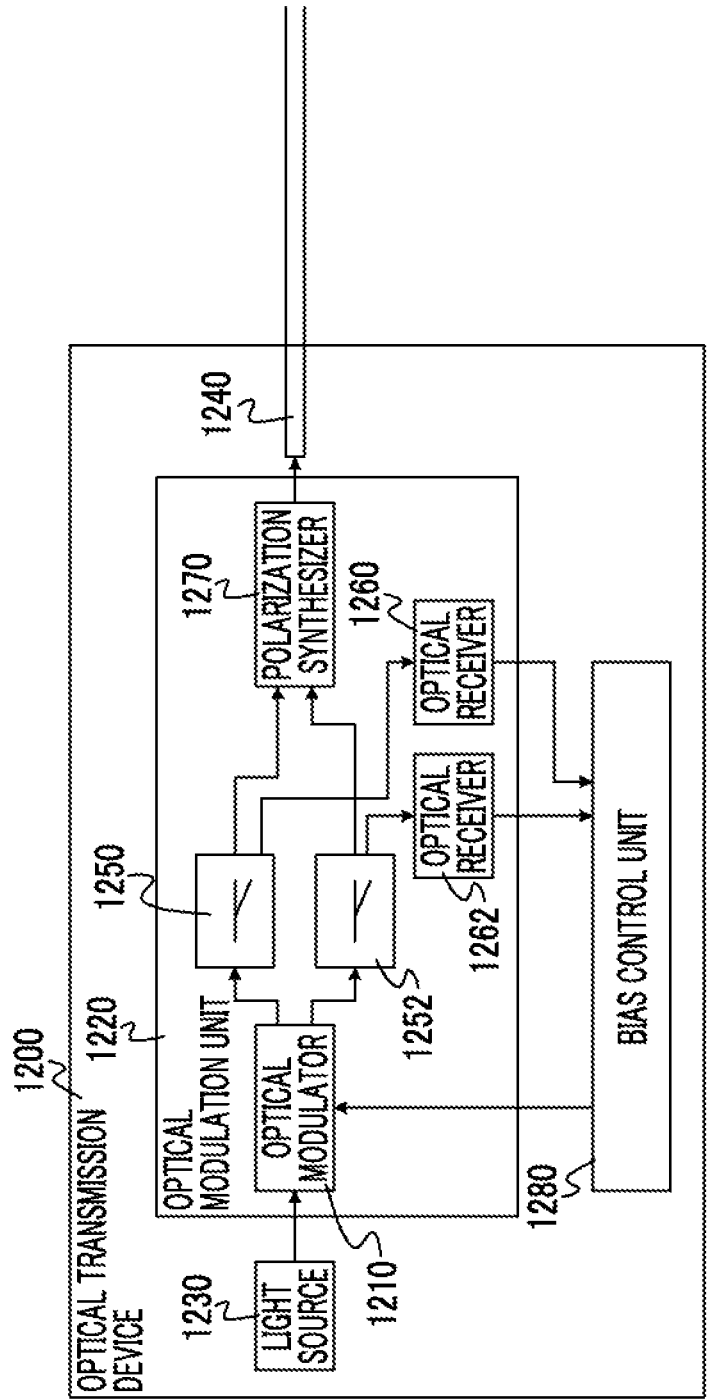
FIG. 12 is a view illustrating a configuration of an optical transmission device according to a third embodiment of the invention.

FIG. 12 is a view illustrating a configuration of the optical transmission device according to this embodiment. This optical transmission device 1200 includes an optical modulation unit 1220 including an optical modulator 1210, a light source 1230 from which light beams are incident to the optical modulator 1210, and an optical fiber 1240 that transmits light beams output from the optical modulation unit 1220.

The optical modulation unit 1220 further includes two optical branching units 1250 and 1252 which respectively branch parts of two orthogonal polarized light beams output from the optical modulator 1210, and optical receivers 1260 and 1262 each receiving one light beam that is branched by each of the optical branching units 1250 and 1252. An output of the optical receivers 1260 and 1262 is output as a feedback signal to a bias control unit 1280 (to be described later).

In addition, the optical modulation unit 1220 includes a polarization synthesizer 1270.

The optical modulator 1210 included in the optical modulation unit 1220 is any one of the optical modulators 100 (including arbitrary modification examples illustrated in FIG. 3 to FIG. 9) and 1000 illustrated in FIG. 1 and FIG. 10, and the polarization synthesizer 1270 multiplexes two orthogonal polarized waves which are output from the optical modulator 1210 and pass through the optical branching units 1250 and 1252, and inputs the two orthogonal polarized waves to the optical fiber 1240.

The optical transmission device 1200 further includes the bias control unit 1280 as a control device that controls bias electrodes provided to the optical modulator 1210. The bias control unit 1280 applies a bias voltage, in which a dither signal for detection of a bias point variation is superimposed on a DC voltage for a bias point control, to bias electrodes provided to the optical modulator 1210. In addition, the bias control unit 1280 monitors the intensity of a dither signal frequency component in the feedback signal output from the optical receivers 1260 and 1262 in the optical modulation unit 1220 so as to control the magnitude of the DC voltage that is applied to the bias electrodes provided to the optical modulator 1210.

In addition, when optical modulator 1210 includes a plurality of bias electrodes, the bias control unit 1280 applies a bias voltage using a dither signal of a frequency different for each of the bias electrodes to the bias electrode.

Furthermore, the dither signal is not limited to a sinusoidal wave, and may be set to a signal having an arbitrary waveform such as a sawtooth wave, a pulse wave, a triangular wave, and a step-wise wave.

In addition, it is not necessary for the dither signal to be a signal that is always applied, and the dither signal may be an electrical signal that is intermittently applied to detect a bias point. In addition, in the above-described examples, a configuration, in which a photo detector is provided on waveguides branched into two parts, is exemplified. However, the photo detector may be provided to a portion not on the waveguides regardless of the number of branches of the waveguides as long as the photo detector is provided on the substrate.

As described above, the optical modulators (100 and 1000) illustrated in the embodiments include a plurality of bias electrodes (158*a* and the like) and photo detectors (162*a* and the like) configured to monitor the intensity of emission light beams (modulated light beams) on the same substrate (102 and the like). The bias electrodes on the substrate include a surface acoustic wave suppressing unit (190 and the like), which suppresses a surface acoustic wave which occurs from the bias electrodes and arrives at the photo detectors, between a region in which the bias electrodes are formed and a portion in which the photo detectors are disposed on the substrate.

According to this, in the optical modulators 100 and 1000, a variation caused by the surface acoustic wave, which occurs from the bias electrode 158*a* and the like due to the dither signal applied to the bias electrode 158*a* and the like, does not occur in the intensity of emission light beams which is detected by the photo detector 162*a* and the like. As a result, it is possible to detect the intensity of a dither signal component included in the emission light beams with accuracy by using the photo detector 162*a* and the like. Accordingly, it is possible to perform a stable bias control operation, and it is possible to maintain transmission quality in optical signal transmission using the optical modulators 100 and 1000 in a satisfactory manner.

REFERENCE SIGNS LIST

100, 1000: optical modulator
102, 1002: substrate
104, 112*a*, 112*b*: incident waveguide
106, 114*a*, 114*b*: optical branching unit
110*a*, 110*b*, 130*a*, 130*b*, 132*a*, 132*b*: Mach-Zehnder optical waveguide
116*a*, 116*b*, 134*a*, 134*b*, 136*a*, 136*b*: parallel waveguide
120*a*, 120*b*: Y-junction, Y-branch coupler
122*a*, 122*b*: emission waveguide
146*a*, 146*b*, 152*a*, 152*b*, 158*a*, 158*b*: bias electrode
160*a*, 160*b*: branched waveguide
162*a*, 162*b*: photo detector
168*a*, 168*b*, 668, 968: monitor electrode
190, 490, 890: guard pattern
170, 172, 174, 176, 178, 180, 182, 184, 186: RF electrode
390, 590, 790, 892, 990: resin
1090: groove
1200: optical transmission device
1210: optical modulator
1220: optical modulation unit
1230: light source
1240: optical fiber
1250, 1252: optical branching unit
1260, 1262: optical receiver
1270: polarization synthesizer
1280: bias control unit

The invention claimed is:

1. An optical modulator comprising:
a substrate having an electro-optic effect;
an optical waveguide that is formed on the substrate;
a plurality of bias electrodes each of which controls an optical wave that propagates through the optical waveguide; and
a plurality of photo detectors each of which is disposed on the substrate, and monitors an optical signal that propagates through the optical waveguide,
wherein the plurality of bias electrodes and the plurality of photo detectors are disposed on a same surface of the substrate, and
wherein at least one suppressing unit, which suppresses a surface acoustic wave that propagates from the bias electrode to the photo detector, is entirely disposed between a region in which the bias electrode is formed and a portion in which the photo detector is disposed on the substrate.

2. The optical modulator according to claim 1, wherein the suppressing unit is constituted by a metallic film that is provided between the region in which the bias electrode is formed and the portion in which the photo detector is disposed on the substrate.

3. The optical modulator according to claim 2, wherein the metallic film is an electrode to which the photo detector is connected.

4. The optical modulator according to claim 1, wherein the suppressing unit is constituted by a resin that is applied between the region in which the bias electrode is formed and the portion in which the photo detector is disposed on the substrate.

5. The optical modulator according to claim 1, wherein the suppressing unit is constituted by a metallic film that is formed on the substrate to surround the periphery of the photo detector.

6. The optical modulator according to claim 1, wherein the suppressing unit is constituted by a resin that is applied onto the substrate in the vicinity of an edge of the photo detector.

7. The optical modulator according to claim 1, wherein the suppressing unit is constituted by a resin that is applied onto the substrate to surround the periphery of the photo detector.

8. An optical transmission device comprising: the optical modulator according to claim 1.

* * * * *